US010567295B2

(12) United States Patent
Barton et al.

(10) Patent No.: US 10,567,295 B2
(45) Date of Patent: Feb. 18, 2020

(54) METHOD AND SYSTEM FOR TELEPROTECTION OVER SEGMENT ROUTING-BASED NETWORKS

(71) Applicant: Cisco Technology, Inc., San Jose, CA (US)

(72) Inventors: Robert Barton, Richmond (CA); Maik Guenter Seewald, Nuremberg (DE); Michael Alan Kowal, Summit, NJ (US); Muthurajah Sivabalan, Kanata (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/982,935

(22) Filed: May 17, 2018

(65) Prior Publication Data

US 2019/0356600 A1  Nov. 21, 2019

(51) Int. Cl.
*H04L 12/841* (2013.01)
*H04L 12/24* (2006.01)
*H04L 12/26* (2006.01)
*H04B 7/14* (2006.01)

(52) U.S. Cl.
CPC ............. *H04L 47/283* (2013.01); *H04B 7/14* (2013.01); *H04L 41/0668* (2013.01); *H04L 43/062* (2013.01); *H04L 43/0852* (2013.01)

(58) Field of Classification Search
CPC . H04L 47/283; H04L 41/0668; H04L 43/062; H04L 43/0852; H04B 7/14
See application file for complete search history.

(56) References Cited

U.S. PATENT DOCUMENTS

| 2002/0118296 A1* | 8/2002 | Schwab | H04N 7/01 |
| 2003/0145294 A1* | 7/2003 | Ward | G06F 17/50 |
| 2003/0172235 A1* | 9/2003 | Letey | G06F 12/00 |
| 2014/0208099 A1* | 7/2014 | Rajsic | H04L 9/14 |
| 2018/0069780 A1* | 3/2018 | Dhanabalan | H04L 12/721 |
| 2018/0248784 A1* | 8/2018 | Fukada | H04L 12/707 |

* cited by examiner

*Primary Examiner* — Ronald B Abelson
(74) *Attorney, Agent, or Firm* — Behmke Innovation Group LLC; James Behmke; Stephen D. LeBarron (57) ABSTRACT

A method for teleprotection over a segment routed network comprises receiving network requirements for communication between a first teleprotection relay and a second teleprotection relay, the first teleprotection relay associated with a first router of the segment routed network, and the second teleprotection relay associated with a second router of the segment routed network, identifying a primary path from the first router to the second router satisfying the network requirements, determining a congruent reverse of the primary path satisfies the network requirements, sending, to the first router, the primary path, the first router routing traffic from the first teleprotection relay to the second teleprotection relay using the primary path, and sending, to the second router, the congruent reverse of the primary path, the second router routing traffic from the second teleprotection relay to the first teleprotection relay using the congruent reverse of the primary path.

18 Claims, 4 Drawing Sheets

METHOD AND SYSTEM FOR TELEPROTECTION OVER SEGMENT ROUTING-BASED NETWORKS

FIELD OF THE DISCLOSURE

The technical field of the present disclosure generally relates to improved methods, computer software, and/or computer hardware in packet data telecommunications networks as used in the electric power generation and distribution industry. Another technical field is segment routed networks. More specifically, the present disclosure relates to computer-implemented techniques for teleprotection of electric power utilities using segment routed networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Extremely latency sensitive applications, such as teleprotection and Wide-Area Monitoring Protection and Control (WAMPAC) systems are commonly used by commercial or municipal power utilities to protect primary substation equipment based on measurements of current differential between Intelligent Electrical Devices (IEDs) connected to power lines, or between feeder lines. Synchronous communication between pairs of electrical protection relays is used to communicate real-time current measurements to detect faults in the line, as indicated by a loss of power. Because current on power lines alternates, measurements must be time synchronized between relays in different substations. Therefore, the communications network between the relays is extremely sensitive to delay and jitter.

Teleprotection systems are being deployed today on a variety of packet-based network topologies, including Multiprotocol Label Switching (MPLS) packet networks using traditional modalities, such as Multiprotocol Label Switching-Transport Profile (MPLS-TP), Multiprotocol Label Switching-Traffic Engineering (MPLS-TE), and Flex Virtual Private Network (FlexVPN). These solutions meet some of the needs of teleprotection but do not meet all the needs. Further, the solutions are difficult to design, deploy, troubleshoot, and otherwise use. Improved solutions for teleprotection systems over packet networks are needed.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This disclosure presumes that readers have a foundation of knowledge of, and experience in using, teleprotection networks in the electric power generating and distribution industry. A secure and uninterrupted supply of electricity is only possible with the help of comprehensive protection and control functions, which ensure the reliable operation of the power system. As the complexity and ratings of electrical power systems increase, so do also the demands on the protective devices and systems which have to protect them from damage and preserve power system stability. Protection relays in conjunction with communication links provide the best possible means of selectively isolating faults on HV lines, transformers, reactors and other important items of electrical plants. To prevent the system from failure and damage, the teleprotection system has to selectively disconnect the faulty part by transferring command signals within the shortest possible time.

This disclosure presumes that readers have a foundation of knowledge of, and experience in using, segment routed networks. Segment routing is a method of forwarding packets on the network based on the source routing paradigm. The forward path is determined before the packet is even sent. The path is encoded in the packet, at the source as a list of segments bearing forwarding instructions. At each hop the top segment, which references a router information base (RIB), is used to identify the next hop. Segments are stacked in order, at the top of the packet header. When the top segment contains the identity of another node, the receiving node uses ECMP to move the packet to the next hop. Or, when the identity is that of the receiving node, the node pops the top segment and performs the task required by the next segment. Segment Routing leverages extensions to existing Interior Gateway Protocols (IGPs) (e.g., Intermediate System to Intermediate System (IS-IS), Open Shortest Path First (OSPF), etc.), does not require any path signaling, and runs natively on an MPLS data plane. Segment Routing is an easier and more scalable way of steering packets through a network.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. OVERVIEW
2. EXAMPLE COMPUTER SYSTEM IMPLEMENTATION
3. EXAMPLE FUNCTIONAL IMPLEMENTATION
4. EXAMPLE TELEPROTECTION OVER SEGMENT ROUTING-BASED NETWORKS
5. HARDWARE OVERVIEW

1. Overview

Computer-implemented techniques are provided for teleprotection over segment routing-based networks. Teleprotection is one of the most sensitive uses of packet-based networks. Failure to meet the latency, differential latency, jitter, and/or bandwidth requirements can lead to desynchronization between electrical relays causing damage or even explosions of equipment. The requirements of Teleprotection Relays, as defined by International Electrotechnical Commission (IEC) 61850 include the following: end to end latency of less than 10 milliseconds; differential bidirectional latency of 500 microseconds to 1 millisecond; circuit high availability to restore relay communication over a failed path. The failover circuit needs to meet the end to end latency and differential bidirectional latency requirements; and circuit monitoring where faults anywhere in the circuit will invoke a circuit failover.

To satisfy these requirements using a segment routing-based network, the present invention provides the following: 1.) deterministic path traffic engineering: the path through the network between the two relays is such that latency can be guaranteed to be less than a required amount. Hop-by-hop traffic engineering is used where each hop is known and the total end to end latency may be calculated and monitored; 2.) path congruency: due to the strict differential between forward and reverse latency, the forward and reverse path is required to be congruent; 3.) continual circuit monitoring with 1:1 path failover: because a failure of communication between the relays can cause the electrical system to become unbalanced, it is imperative to restore communications as quickly as possible; 4.) guaranteed bandwidth: bandwidth is guaranteed to ensure reliable communications.

In one embodiment, a method for teleprotection over a segment routed network is provided, the method comprising receiving, from a first teleprotection relay, one or more network requirements for communication between the first teleprotection relay and a second teleprotection relay, wherein the first teleprotection relay is associated with a first router of the segment routed network, and wherein the second teleprotection relay is associated with a second router of the segment routed network, identifying a primary path from the first router to the second router satisfying the one or more network requirements, determining a congruent reverse of the primary path satisfies the one or more network requirements and that the first router and the second router are reporting similar latency values, sending, to the first router, the primary path, wherein the first router routes traffic from the first teleprotection relay to the second teleprotection relay using the primary path, sending, to the second router, the congruent reverse of the primary path, wherein the second router routes traffic from the second teleprotection relay to the first teleprotection relay using the congruent reverse of the primary path.

Other embodiments, aspects and features will become apparent from the disclosure as a whole. Embodiments are described that provide significant improvements to teleprotection and computer networks by using segment routing to meet the needs of teleprotection. These techniques offer reduced use of network bandwidth, CPU cycles, storage and memory because of the efficiency of the messages, decisions and algorithms that are disclosed.

2. Example Computer System Implementation

Figure 1:
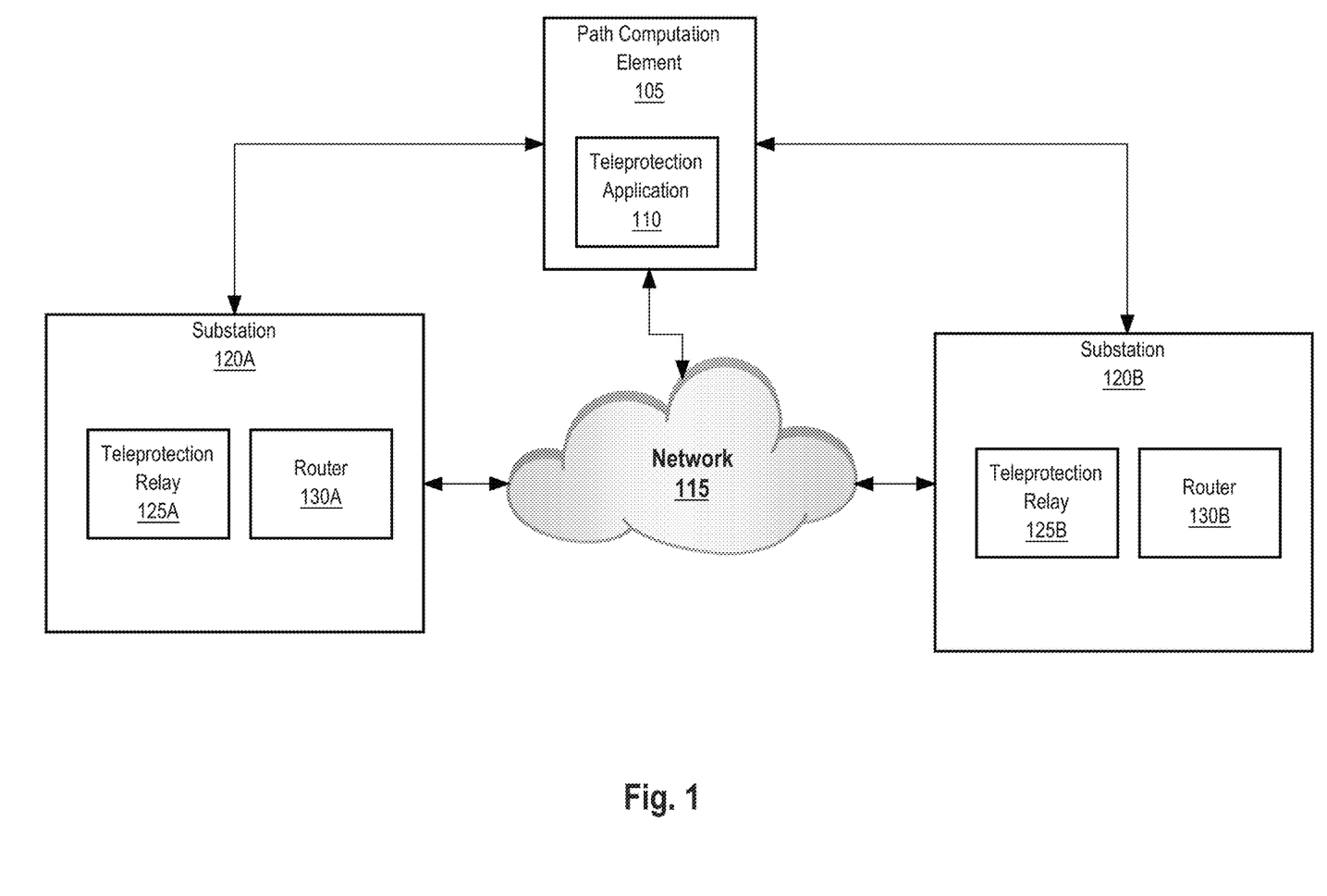
FIG. 1 illustrates an example computer system in which the techniques described herein may be practiced, in an embodiment.

FIG. 1 illustrates a system in which the techniques described may be practiced, according to one embodiment.

FIG. 1 comprises components that are implemented at least partially by hardware at one or more computing devices, or one or more hardware processors, executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates path computation element 105, teleprotection application 110, network 115, substation 120A, 120B, teleprotection relay 125A, 125B, and router 130A, 130B. Path computation element 105 may be any computing device or devices, including but not limited to: servers, racks, work stations, personal computers, general purpose computers, laptops, Internet appliances, wireless devices, wired devices, multi-processor systems, mini-computers, and the like. Although FIG. 1 shows path computation element 105 as a single element, path computation element 105 broadly represents one or multiple computing devices and may be located in one or more physical locations. Path computation element 105 also may represent one or more virtual computing instances that execute using one or more computers in a datacenter such as a virtual server farm. Path computation element 105 may be connected through any kind of computer network using any combination of wired and wireless communication, including, but not limited to: a Local Area Network (LAN), a Wide Area Network (WAN), one or more internetworks such as the public Internet, or a company network.

Generally, path computation element 105 is a device, application, or network node that can identify and determine a suitable route for conveying data between two devices or locations. Path computation element 105 executes teleprotection application 110, which provides some of the specific functionality needed for the present invention. Before describing teleprotection application 110 in detail, the rest of FIG. 1 will be described.

Network 115 is any kind of computer network or networks using any combination of wired and wireless communication, including, but not limited to: a LAN, a WAN, the Internet, or a company network. Network 115 may be a private network, a public network, or a combination of both private and public networks. Although depicted as a single item, network 115 may include any number of different networks. Network 115 includes network infrastructure devices or nodes (not shown). The network infrastructure devices or nodes may be any suitable devices including, but not limited to, switches, routers, servers, access points, computers, etc. Network 115 may be made of heterogenous or homogenous devices running any version of applicable software, applications, drivers, etc. Any number of network infrastructure devices or nodes may be present in network 115. Network 115 is a segment routed network, and accordingly supports the segment routing performed by path computation element 105 and teleprotection application 110. Thus, a path may be programmed through network 115 by the path computation element 105 that addresses, hop by hop, the exact path that packets will take through network 115 when traveling from point A to point B.

Substations 120A, 120B are electrical substations that are part of an electrical generation, transmission, and/or distribution system. Substations 120A, 120B may be of any type and perform any function, such as a transmission substation, distribution substation, collector substation, converter substation, switching substation, etc. FIG. 1 shows two substations, substation 120A and substation 120B, although any number of substations may be present. For the purposes of FIG. 1, substation 120A may be the first substation, which is sending data across network 115 for teleprotection to substation 120B, which may be the second substation. Although depicted as a single item in FIG. 1, substations 120A, 120B may include any number of components or elements, and may be spread across any amount of space or spaces. Specifically, substations 120A, 120B include teleprotection relays 125A, 125B, and routers 130A, 130B, respectively.

Teleprotection relays 125A, 125B are protective relays designed to protect the elements or devices at substations 120A, 120B. Teleprotection relays 125A, 125B may include any number of different components are parts, as needed by the particular use, customer, producer, engineer, etc. Teleprotection relays 125A, 125B may be physical devices, applications, or a combination thereof. Teleprotection relays 125A, 125B may include functionality to execute one or more applications (not shown). The applications may be created or sold by a third party and may be used by an owner or user of teleprotection relay 125A, 125B for any purpose. The applications include certain network requirements to ensure teleprotection, such as latency, jitter, and bandwidth. Latency is a measure of a time delay between sending a packet from a source and the destination receiving that packet. End to end, or round trip, latency is the one-way latency from source to destination plus the one-way latency from destination back to the source. Jitter is the variation in latency as measured in the variability over time of the packet latency across a network. Bandwidth is the bit rate of the maximum throughput of the network. Depending on the application, the version of the application used, and the specific settings of the application, the requirements for latency, jitter, and bandwidth may vary. Thus, the application sends, to the path computation element 105, the network requirements so that the path computation element 105 may determine the proper path through network 115 for any data sent by the application. The applications may change their network requirements at any time, for any reason. Teleprotection relay 125A, 125B may include any number of applications. Teleprotection relay 125A, 125B are communicatively connected with the path computation element 105 and other elements of the system of FIG. 1 using any combination of wired and wireless communication, including, but not limited to: a Local Area Network (LAN), a Wide Area Network (WAN), one or more internetworks such as the public Internet, or a company network.

Routers 130A, 130B are routers, switches, computing devices, or other network infrastructure devices that are on the edge of network 115. In other words, router 130A and router 130B are associated with substation 120A or substation 120B, respectively (and thus teleprotection relay 125A, 125B), and are used to send packets through network 115. A particular router 130A, 130B may be a "head" router when that router is the beginning of a path through network 115, while the other router may be a "tail" router when that router is at the end of a path through network 115. Routers 130A, 130B are configured to support segment routing and other functionality needed by the invention described herein. Routers 130A, 130B may be produced by any company or entity, and may be owned, managed, or used, by any suitable entity. Routers 130A, 130B are communicatively connected with the path computation element 105 and other elements of the system of FIG. 1 using any combination of wired and wireless communication, including, but not limited to: a Local Area Network (LAN), a Wide Area Network (WAN), one or more internetworks such as the public Internet, or a company network.

Returning to teleprotection application 110, teleprotection application 110 is programmed or configured to receive, collect, and monitor network data and the health of network 115. The monitoring may be performed in multiple different ways and at any time. The network data and/or health data may be received or collected in any format. For instance, teleprotection application 110 may receive latency, jitter, and bandwidth measurements from routers 130A, 130B. Additionally, teleprotection application 110 may also receive latency, jitter, or bandwidth measurements from teleprotection relays 125A, 125B. The measurements from different sources may be compared to determine where latency is occurring, and what actions, if any, should be taken. For example, by comparing latency information from router 130A and teleprotection relay 125A, teleprotection application 110 can determine whether the latency is based on the network (that is, latency reported by router 130A and not teleprotection relay 125A), or if latency is caused by an application of teleprotection relay 125A (that is, latency reported by teleprotection relay 125A and not router 130A). In other words, latency may be measured on the network level and the application level. Additionally, teleprotection application 110 may receive network data from each node of network 115, or from any other suitable sources.

Teleprotection application 110 is programmed or configured to receive network requirements of an application, as discussed above. The network requirements may be received in any format at any time. For example, the network requirements may be received using Path Computation Element Protocol (PCEP) or any other protocol. Teleprotection application 110 is programmed or configured to identify a primary path through network 115. The primary path through network 115 must satisfy the network requirements of the application of teleprotection relay 125A. The primary path may include any number of nodes or hops, in any order. Teleprotection application 110 may identify the primary path in any suitable manner. After identifying the primary path, teleprotection application 110 is programmed or configured to determine whether the reverse of the primary path also satisfies the network requirements. The reverse of the primary path is a congruent reverse, to achieve path congruency. Path congruency ensures that there is equivalent latency in forward and reverse directions. In other words, if the primary path is ABCD, then the reverse is DCBA. In addition to satisfying the network requirements, the tail end router should also report the same latency for the reverse as the head end router does for the primary direction (or be within an acceptable margin of error or threshold), and the same segment routing policies need to be set in the tail end router as are set in the head end router. This ensures path congruency and provides the tight controls and standards needed for teleprotection. In other words, the head end and tail end instructions for segment routing are aware of each other and are synchronized.

Teleprotection application 110 is programmed or configured to identify a backup path and determine a reverse of the backup path. Teleprotection application 100 may identify or determine the backup path and the reverse of the backup path in the same manner as the primary path and/or the reverse of the primary path. However, teleprotection application enforces additional requirements on the backup path.

The backup path must be completely separate from the primary path. This way, if there is a failure anywhere on the primary path, the backup path is ensured to still be viable, as there are no shared nodes (aside from the head router and the tail router). Thus, if the primary path is ABCD, then the backup path cannot contain A, B, C, or D. Therefore, the backup bath may be EFGHI.

Teleprotection application 110 is programmed or configured to determine the capabilities of nodes in a primary or backup path. The specific capabilities may include any hardware, software, configuration, or other setting. The capabilities may be identified by polling or querying the nodes during network setup, after identifying a path, periodically, or at any other time. The capabilities may also be identified using other methods, such as comparison of a device type or version with a database of known capabilities. In particular, one capability teleprotection application 110 identifies is the Segment Identifier (SID) label stack depth for each node or hop in a path. Each node or hop must support sufficient depth to identify the entire path. If teleprotection application 110 determines that a node or hop does not support sufficient label depth, which may vary on different routing platforms, then a Binding SID may be used or applied to the nodes or hops that do not support sufficient depth. Alternatively, teleprotection application 110 may use a constrained label stack that accommodates the supported label depth of the node(s) or may return an error and attempt to find a different path.

Teleprotection application 110 is programmed or configured to instruct the head and tail routers to employ Connection Admission Control (CAC) and to periodically send the resulting data to teleprotection application 110. The data may be sent at any interval in any manner. CAC allows the teleprotection application 110 to determine the available bandwidth and ensure that there is sufficient bandwidth for the paths. The results from CAC may also be used by teleprotection application 110, the head router, or the tail router, to determine there is insufficient bandwidth and initiate a failover to the backup path. The instruction may be sent to the routers in any manner, at any time, and may be executed in any suitable manner.

Teleprotection application 110 is programmed or configured to instruct the head and tail routers to utilize an in-band Operations, Administration, and Management (OAM) channel to automate protocol-based forwarding path failure detection times to meet the demanding network requirements of teleprotection. The time measurements by the routers may utilize Precision Time Protocol (PTP), or any other suitable standard. The instruction may be sent to the routers in any manner, at any time, and may be executed in any suitable manner.

Teleprotection application 110 is programmed or configured to send identified or determined paths to routers 130A, 130B. The paths may be sent in any format, at any time, and in any manner. The paths may include SID labels for each hop in the path, so that the exact path that each packet will be taking through the network is known in advance. The paths may be stored locally on the head and/or tail router (or other suitable location(s)) and updated or altered by teleprotection application 110 as needed. A new or updated path may be sent at any time for any reason.

Teleprotection application 110 is programmed or configured to determine that the network requirements are not met and initiate a failover to the backup path. The determination may be based on any available network data that the teleprotection application 110 has received. Once teleprotection application 110 has determined that a failover should be initiated, teleprotection application 110 sends the instructions to the head and tail routers as needed. Alternatively, or in addition, the head and tail routers may independently determine that a failover is necessary and initiate a failover, and subsequently notify teleprotection application 110.

3. Example Functional Implementation

Figure 2:
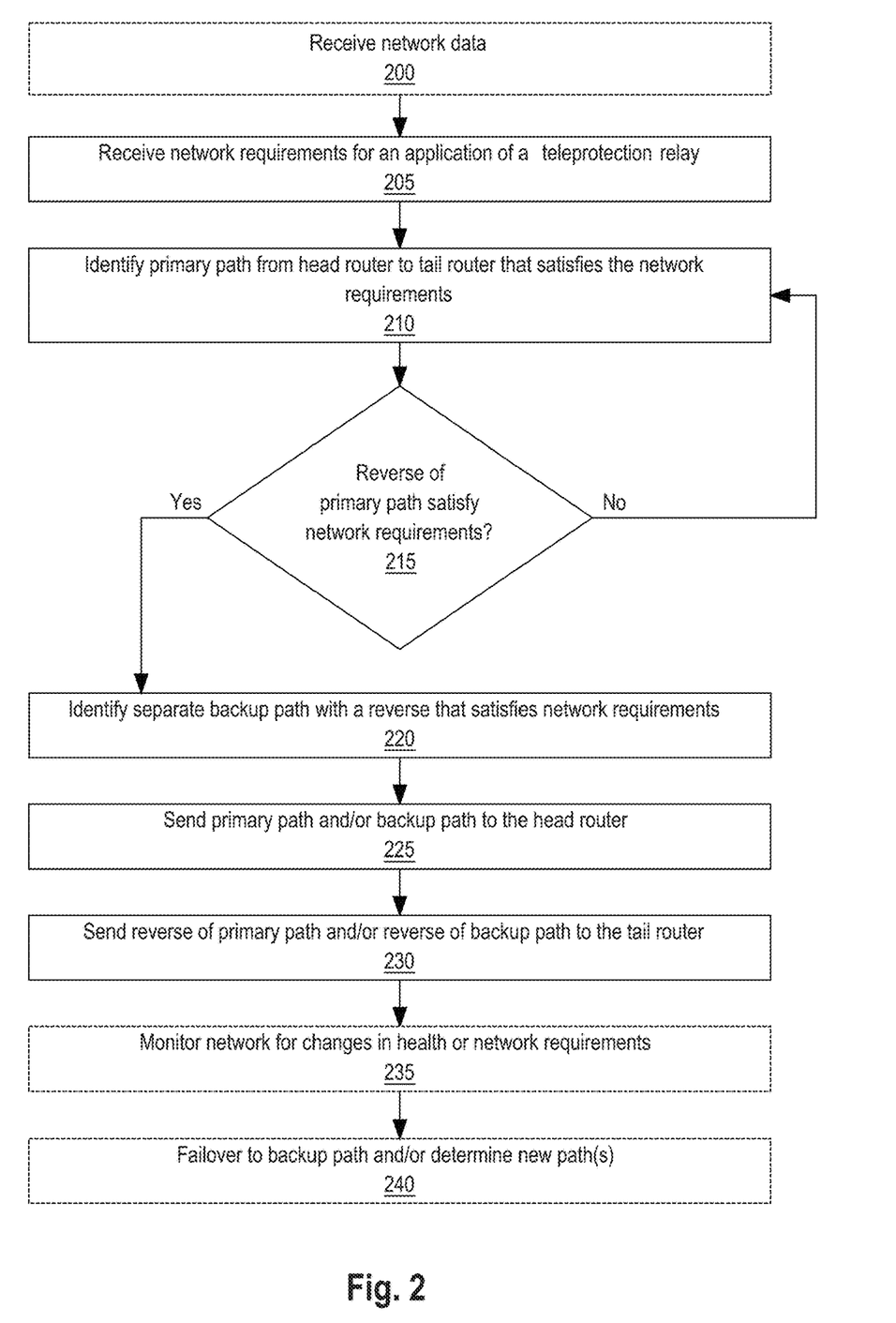
FIG. 2 illustrates a programmable algorithm or method for teleprotection over segment routing-based networks in accordance with an embodiment.

FIG. 2 illustrates an example programmable algorithm or method for teleprotection over segment routing-based networks. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, network data is received. As indicated by the dotted lines, the network data may be received in any format, at any time, and from any source. The network data may include latency, jitter, and/or bandwidth data, as well as other indicators of network health and operational data. The "same" information may be received from different sources, such as a latency report from a teleprotection relay and a latency report from a head or tail router. Other sources of network data include the nodes of the network, associated databases or databases storing related information, etc.

In step 205, network requirements for an application of a teleprotection relay are received. The network requirements are set by the application based on the use and needs of the application. The network requirements of the application may be set by an engineer, programmer, administrator, user, or any other entity. Any number of different network requirements may be received, such as a latency requirement, a jitter requirement a bandwidth requirement, and/or any other suitable requirements. Additionally, different applications from the same teleprotection relay may have different network requirements, and can be addressed separately, resulting in different primary and/or backup paths for different applications of the same teleprotection relay.

In step 210, a primary path from the head router to the tail router that satisfies the network requirements is identified. The primary path may include any number of nodes or hops, in any order. The primary path may be identified in any suitable manner, at any time. The primary path identifies each hop needed for sending a packet from the source to the destination.

In step 215, a determination is made whether the reverse of the primary path also satisfies the network requirements. If the reverse does not satisfy the network requirements, the method returns to step 210 to identify a different primary path. If the reverse does satisfy the network requirements, the method continues to step 220. The reverse of the primary path is congruent so that path congruency is achieved, and the strict requirements of teleprotection may be met. Additionally, the reverse path must also satisfy additional requirements beyond the network requirements: the tail end router needs to report the same latency as the head router (or within a suitable threshold amount), and the tail end router needs to have the same policy set as the head end router. If all of these are met, then the reverse path is acceptable.

In step 220, a separate backup path, with a reverse, that satisfies the network requirements is identified. The backup path may be identified in the same manner as the primary path, except that there is an added requirement: the backup path must be completely separate from the primary path. In other words, no node or hop used in the primary path may be used in the backup path. That way, if a failover occurs, the backup path will be viable because none of the nodes or hops overlap.

In step 225, the primary path and/or the backup path is sent to the head router. The paths may be sent at any time in any format. For example, the paths may be sent as a full set of SID labels, thereby identifying hop-by-hop every step a packet will take through the network. The head router may locally store the primary path and/or the backup path, as needed.

In step 230, the reverse of the primary path and/or the reverse of the backup path is sent to the tail router. The paths may be sent at any time in any format. For example, the paths may be sent as a full set of SID labels, thereby identifying hop-by-hop every step a packet will take through the network. The tail router may locally store the reverse primary path and/or the reverse backup path, as needed.

In step 235, the network is monitored for changes in health or network requirements. The network may be monitored by the head router, the tail router, the teleprotection relays, the individual nodes or hops, the path computation element, and/or any combination of the above. Any aspect of the network may be monitored. The data may include that discussed in step 200, or any other relevant network data. In particular, CAC may be employed by the head and/or tail routers to determine and ensure that there is sufficient bandwidth is available. Additionally, an in-band OAM channel between the head router and the tail router may be used for automated protocol-based forwarding path failure detection times. Likewise, as another example, latency may be monitored over the full path at both the application level and the network level. Any of the above discussed data or information may be sent to the path computation element for processing, and may be used to make any suitable decisions, such as identifying a new primary path, a new backup path, determining that a failover should occur, etc. Further, the monitoring may occur for the primary path, the backup path, and/or other nodes of the network, even if the other nodes are not currently in use by a path.

In step 240, new paths are determined and/or the backup path is failed over to. The new paths may be determined in any suitable manner, such as in steps 210, 215, and 220. New paths may be determined in response to receiving new network requirements, or in response to a change in the network, or for any other reason. In the event of a failover, the path computation element may instruct the head router and/or tail router to initiate the failover. Alternatively, the head router or the tail router may initiate a failover based on any other suitable instructions or determination.

Using this process, teleprotection may be performed using a segment routed packet network. Previously, segment routing was unable to be used to perform teleprotection. By applying the method discussed above, substantial amounts of bandwidth, power, and processing time may be saved. Additionally, improvements are made to the computer system by allowing a cheaper, easier, more flexible, accurate, and safer method of teleprotection.

4. Example Teleprotection Using Segment Routed Networks

Figure 3:
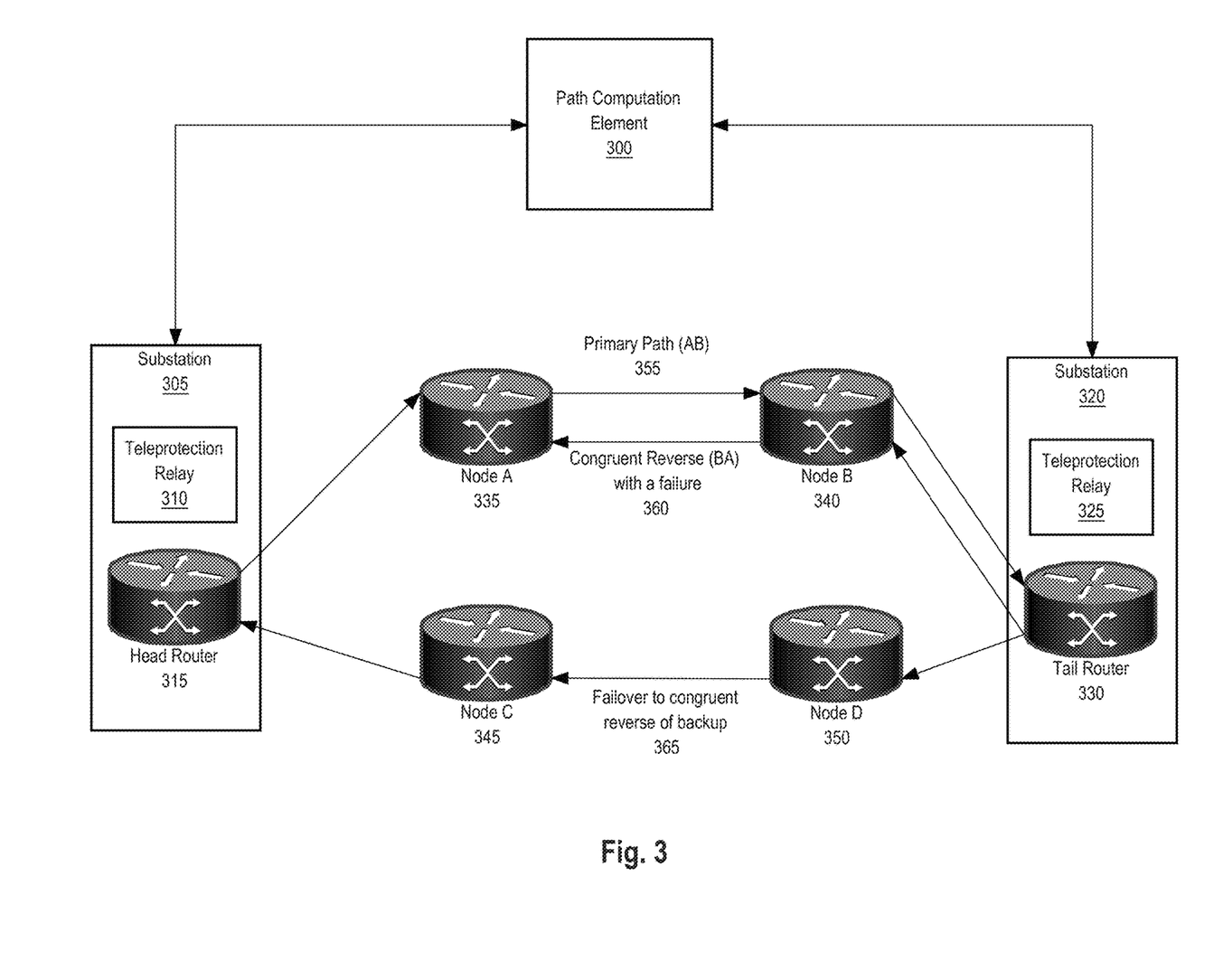
FIG. 3 illustrates an example of teleprotection over segment routing-based networks.

FIG. 3 illustrates an example of teleprotection using segment routed networks in accordance with an embodiment. The example of FIG. 3 has been greatly simplified to ease describing and understanding the invention and, as such, the invention should not be limited to the example of FIG. 3.

In FIG. 3, teleprotection is being provided for substation 305 and substation 320 using a segment routed network. The segment routed network includes head router 315, tail router 330, node A 335, node B 340, node C 345, and node D 350. Substation 305 includes teleprotection relay 310 and head router 315, while substation 320 includes teleprotection relay 325 and tail router 330.

Prior to the state shown in FIG. 3, teleprotection relay 310 communicated network requirements needed by an application to the path computation element 300. The network requirements included end to end latency of less than 10 milliseconds, jitter of less than 1 millisecond, and at least 10 Mbit/s of bandwidth. Based on these requirements, path computation element 300 identified a primary path 355 of node A 335 to node B 340. Path computation element 300 then determined that the network requirements were also met on the reverse of the primary path (that is, node B 340 to node A 335). Additionally, the path computation element also checked that the head router 315 and tail router 330 were reporting consistent latency values, and that both head router 315 and tail router 330 had the same policy configured. Since all of this was true, the path computation element 300 sent the primary path to the head router 315, and the reverse of the primary path to tail router 330, and they were each stored locally on the respective routers.

Path computation element 300 also identified a backup path. The backup path meets all the same requirements as the primary path, but it also meets the added requirement that none of the nodes of the primary path are used in the backup path. Thus, the backup path identified by the path computation element 300 is node C 345 to node D 350, and the reverse being node D 350 to node C 345. The path computation element 300 also sent the backup path to the head router 315, and the reverse of the backup path to the tail router 330, and they were each stored locally on the respective routers.

Now that the background of FIG. 3 has been established, the situation depicted in FIG. 3 may be described. In FIG. 3, packets are being sent over the primary path 355, and other packets are sent back using the reverse of the primary path. Meanwhile, the path computation element is receiving network data and other information from teleprotection relay 310, head router 315, teleprotection relay 325, and tail router 330, among other sources. Of interest is the latency data that path computation element 300 receives. Since the latency data is collected from different sources, both the application layer and the network layer are considered. Path computation element 300 compares the latencies from these layers and determines that the network requirements are not being satisfied—there is a failure in the primary path. The failure is depicted in the congruent reverse with a failure 360.

In response to the failure, path computation element 300 instructs head router 315 and tail router 330 to fail over to the backup path. Tail router 330 immediately fails over to the congruent reverse of the backup path 365, and the packets reach head router 315 within the requirements of teleprotection relay 310. Head router 315 would also begin using the backup path to send packets to the tail router 330.

Using this process, teleprotection may be performed using a segment routed packet network, with all of its inherent technical benefits. Previously, segment routing was unable to be used to perform teleprotection. By applying the method discussed above, substantial amounts of bandwidth, power, and processing time may be saved. Additionally, improvements are made to the computer system by allowing a cheaper, easier, more flexible, accurate, and safer method of teleprotection.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
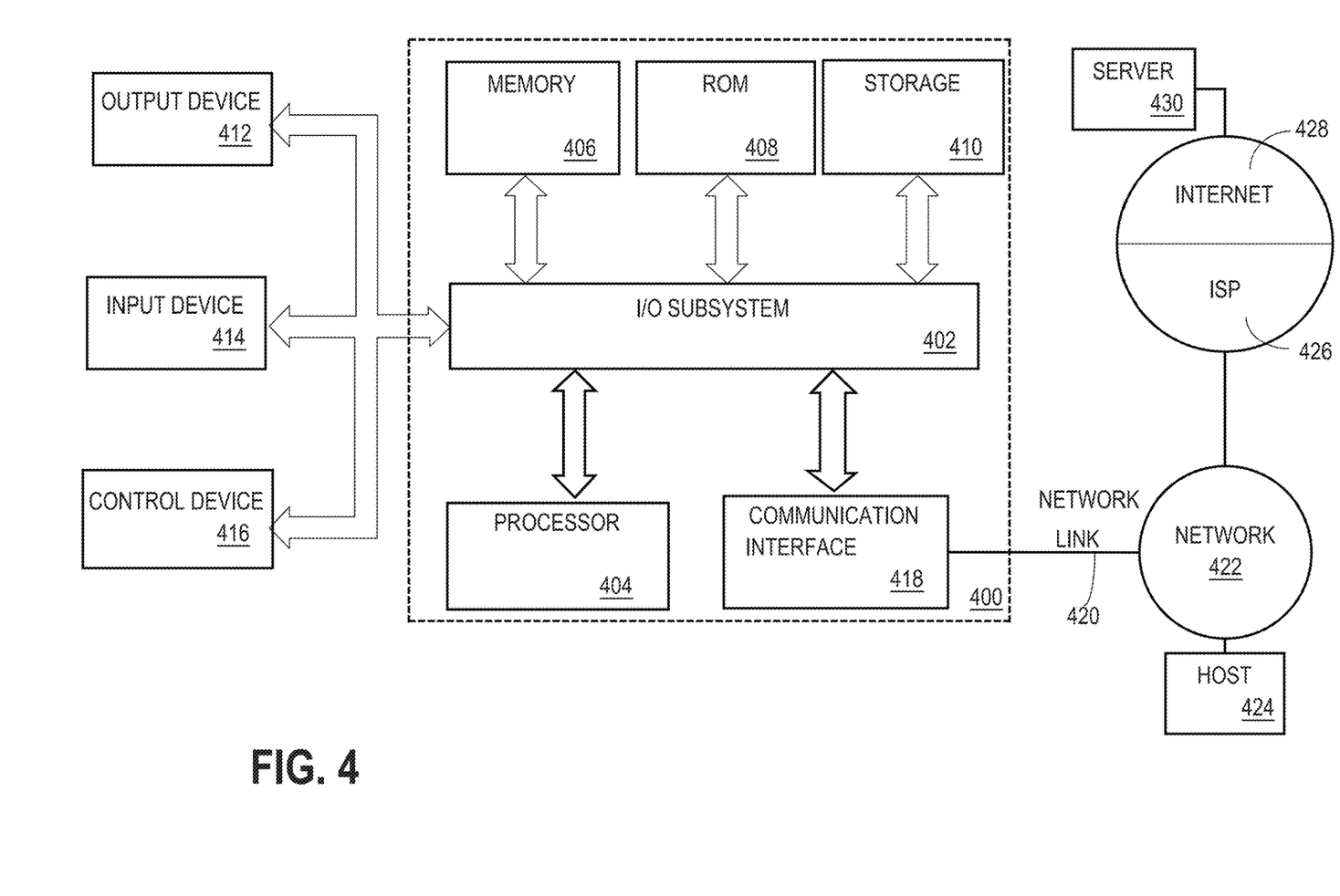
FIG. 4 illustrates a computer system upon which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG, JSON, YANG, PNG, or proprietary formats; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG, PNG, JSON, YANG, or proprietary file formats; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for teleprotection over a segment routed network, the method comprising:
 receiving, from a first teleprotection relay, one or more network requirements for communication between the first teleprotection relay and a second teleprotection relay, wherein the first teleprotection relay is associated with a first router of the segment routed network, and wherein the second teleprotection relay is associated with a second router of the segment routed network;
 identifying a primary path from the first router to the second router satisfying the one or more network requirements;
 determining a congruent reverse of the primary path satisfies the one or more network requirements and that the first router and the second router are reporting similar latency values;
 sending, to the first router, the primary path, wherein the first router routes traffic from the first teleprotection relay to the second teleprotection relay using the primary path;
 sending, to the second router, the congruent reverse of the primary path, wherein the second router routes traffic from the second teleprotection relay to the first teleprotection relay using the congruent reverse of the primary path;
identifying a backup path from the first router to the second router satisfying the one or more network requirements, wherein the backup path is completely separate from the primary path, wherein the backup path is used in response to a failure of the primary path;
determining a congruent reverse of the backup path satisfies the one or more network requirements;
sending, to the first router, the backup path;
sending, to the second router, the congruent reverse of the backup path;
receiving a first latency report from the first router or the second router;
receiving a second latency report from the first teleprotection relay or the second teleprotection relay; and
comparing the first latency report and the second latency report to determine if the first teleprotection relay or the second teleprotection relay are a source of latency.

2. The method of claim 1, wherein the first router determines an available bandwidth of the primary path, wherein the backup path is used when the available bandwidth is insufficient.

3. The method of claim 1, wherein the one or more network requirements comprise latency, jitter, and bandwidth.

4. The method of claim 1, wherein the one or more network requirements are associated with a first application of the first teleprotection relay, and wherein a different primary path is identified for a second application of the first teleprotection relay.

5. The method of claim 1, further comprising:
receiving updated network requirements for communication; and
dynamically identifying an updated primary path from the first router to the second router satisfying the updated network requirements.

6. The method of claim 1, further comprising:
identifying a segment identifier label stack depth for each node or hop in the primary path, wherein each node or hop must support sufficient depth to identify the primary path; and
determining whether each node or hop in the primary path comprises s sufficient depth to identify the primary path.

7. A system for teleprotection over a segment routed network, the system comprising:
one or more processors;
one or more memories storing instructions which, when executed by the one or more processors, cause the one or more processors to:
receive, from a first teleprotection relay, one or more network requirements for communication between the first teleprotection relay and a second teleprotection relay, wherein the first teleprotection relay is associated with a first router of the segment routed network, and wherein the second teleprotection relay is associated with a second router of the segment routed network;
identify a primary path from the first router to the second router satisfying the one or more network requirements;
determine a congruent reverse of the primary path satisfies the one or more network requirements and that the first router and the second router are reporting similar latency values;
send, to the first router, the primary path, wherein the first router routes traffic from the first teleprotection relay to the second teleprotection relay using the primary path;
send, to the second router, the congruent reverse of the primary path, wherein the second router routes traffic from the second teleprotection relay to the first teleprotection relay using the congruent reverse of the primary path;
identify a backup path from the first router to the second router satisfying the one or more network requirements, wherein the backup path is completely separate from the primary path;
determine a congruent reverse of the backup path satisfies the one or more network requirements;
send, to the first router, the backup path;
send, to the second router, the congruent reverse of the backup path, wherein the backup path is used in response to a failure of the primary path;
receiving a first latency report from the first router or the second router;
receiving a second latency report from the first teleprotection relay or the second teleprotection relay; and
comparing the first latency report and the second latency report to determine if the first teleprotection relay or the second teleprotection relay are a source of latency.

8. The system of claim 7, wherein the first router determines an available bandwidth of the primary path, and wherein the backup path is used when the available bandwidth is insufficient.

9. The system of claim 7, wherein the one or more network requirements comprise latency, jitter, and bandwidth.

10. The system of claim 7, wherein the one or more network requirements are associated with a first application of the first teleprotection relay, and wherein a different primary path is identified for a second application of the first teleprotection relay.

11. The system of claim 7, the instructions, when executed, further cause the one or more processors to:
receive updated network requirements for communication; and
dynamically identify an updated primary path from the first router to the second router satisfying the updated network requirements.

12. The system of claim 7, the instructions, when executed, further cause the one or more processors to:
identify a segment identifier label stack depth for each node or hop in the primary path, wherein each node or hop must support sufficient depth to identify the primary path;
determine whether each node or hop in the primary path comprises the sufficient depth to identify the primary path.

13. A non-transitory computer readable medium storing instructions for teleprotection over a segment routed network, the instructions, when executed, cause:
receiving, from a first teleprotection relay, one or more network requirements for communication between the first teleprotection relay and a second teleprotection relay, wherein the first teleprotection relay is associated with a first router of the segment routed network, and wherein the second teleprotection relay is associated with a second router of the segment routed network;

identifying a primary path from the first router to the second router satisfying the one or more network requirements;

determining a congruent reverse of the primary path satisfies the one or more network requirements and that the first router and the second router are reporting similar latency values;

sending, to the first router, the primary path, wherein the first router routes traffic from the first teleprotection relay to the second teleprotection relay using the primary path;

sending, to the second router, the congruent reverse of the primary path, wherein the second router routes traffic from the second teleprotection relay to the first teleprotection relay using the congruent reverse of the primary path;

identifying a backup path from the first router to the second router satisfying the one or more network requirements, wherein the backup path is completely separate from the primary path, wherein the backup path is used in response to a failure of the primary path;

determining a congruent reverse of the backup path satisfies the one or more network requirements;

sending, to the first router, the backup path;

sending, to the second router, the congruent reverse of the backup path;

receiving a first latency report from the first router or the second router;

receiving a second latency report from the first teleprotection relay or the second teleprotection relay; and comparing the first latency report and the second latency report to determine if the first teleprotection relay or the second teleprotection relay are a source of latency.

14. The non-transitory computer readable medium of claim 13, wherein the one or more network requirements comprise latency, jitter, and bandwidth.

15. The non-transitory computer readable medium of claim 13, wherein the instructions, when executed, cause:
identifying a segment identifier label stack depth for each node or hop in the primary path, wherein each node or hop must support sufficient depth to identify the primary path;
determining whether each node or hop in the primary path comprises the sufficient depth to identify the primary path.

16. The non-transitory computer readable medium of claim 13, wherein the first router determines an available bandwidth of the primary path, wherein the backup path is used when the available bandwidth is insufficient.

17. The non-transitory computer readable medium of claim 13, wherein the one or more network requirements are associated with a first application of the first teleprotection relay, and wherein a different primary path is identified for a second application of the first teleprotection relay.

18. The non-transitory computer readable medium of claim 13, wherein the instructions, when executed, cause:
receiving updated network requirements for communication; and
dynamically identifying an updated primary path from the first router to the second router satisfying the updated network requirements.

* * * * *